(12) United States Patent
Ribbens-Mateu (10) Patent No.: US 12,487,991 B2
(45) Date of Patent: Dec. 2, 2025

(54) SYSTEM AND METHOD FOR LOGGING UPDATES ASSOCIATED WITH A LARGE DATA REQUEST

(71) Applicant: The Toronto-Dominion Bank, Toronto (CA)

(72) Inventor: Hippolyte Francis Ribbens-Mateu, London (GB)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/591,577

(22) Filed: Feb. 29, 2024

(65) Prior Publication Data

US 2025/0278400 A1    Sep. 4, 2025

(51) Int. Cl.
  *G06F 16/23* (2019.01)
  *G06F 9/54* (2006.01)
  *G06F 16/22* (2019.01)
  *G06F 16/953* (2019.01)

(52) U.S. Cl.
  CPC .......... *G06F 16/2379* (2019.01); *G06F 9/547* (2013.01); *G06F 16/2219* (2019.01); *G06F 16/953* (2019.01)

(58) Field of Classification Search
  CPC . G06F 16/2379; G06F 16/953; G06F 16/2219
  USPC ........................................................ 707/770
  See application file for complete search history.

(56) References Cited

U.S. PATENT DOCUMENTS

| | | | |
|---|---|---|---|
| 6,088,693 A | 7/2000 | Van Huben et al. | |
| 7,130,891 B2 | 10/2006 | Bernardin et al. | |
| 9,043,401 B2 | 5/2015 | Wong et al. | |
| 9,225,675 B2 | 12/2015 | Patiejunas et al. | |
| 9,767,135 B2 | 9/2017 | Todd | |
| 10,120,579 B1 * | 11/2018 | Patiejunas | G06F 3/061 |
| 10,158,709 B1 | 12/2018 | Muniswamy-Reddy et al. | |
| 10,990,324 B2 * | 4/2021 | Devriendt | G06F 3/067 |
| 11,062,253 B1 | 7/2021 | Nanduri et al. | |
| 11,157,517 B2 | 10/2021 | Mandadi et al. | |
| 11,184,454 B1 | 11/2021 | Kim | |
| 11,416,176 B2 | 8/2022 | Agarwal | |
| 2014/0324881 A1 * | 10/2014 | Ransil | G06F 11/1446 707/741 |

FOREIGN PATENT DOCUMENTS

| | | |
|---|---|---|
| CN | 106325988 B | 6/2019 |
| WO | 2022136926 A1 | 6/2022 |

* cited by examiner

*Primary Examiner* — Kimberly L Wilson
(74) *Attorney, Agent, or Firm* — Rowand LLP (57) ABSTRACT

A computer server system comprises at least one processor; a communications module coupled to the at least one processor; and a memory coupled to the at least one processor and storing processor-executable instructions which, when executed by the at least one processor, configure the at least one processor to receive, via the communications module and from a client device, a hypertext transfer protocol (HTTP) request; determine that the HTTP request includes a large data request; generate a unique identifier for the large data request and store the unique identifier in a database; route the HTTP request to at least one handler function to perform one or more tasks associated with the large data request; and log updates associated with the large data request based on completion or failure of the one or more tasks in the database in association with the unique identifier.

19 Claims, 7 Drawing Sheets

SYSTEM AND METHOD FOR LOGGING UPDATES ASSOCIATED WITH A LARGE DATA REQUEST

TECHNICAL FIELD

The present application relates to systems and methods for logging updates associated with a large data request.

BACKGROUND

Application programming interfaces (APIs) are often provided by server computer systems. Generally, a client device sends an API request to a server. The request may be a hypertext transfer protocol (HTTP) request that may include various components such as for example the request method (e.g. GET, POST), headers (e.g. content type, authentication tokens), and a request body with additional data. The server receives the API request and may perform operations to fulfil the API request.

Oftentimes, the API request may involve one or more long-running operations that include complex computations, data processing and/or fetching large amounts of data. These types of API requests may be referred to as large data requests and often take a significant amount of time to complete.

After sending a large data request, the client device may stand idle until the large data request is completed and a response is received.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Accordingly, in one aspect there is provided a computer server system comprising at least one processor; a communications module coupled to the at least one processor; and a memory coupled to the at least one processor and storing processor-executable instructions which, when executed by the at least one processor, configure the at least one processor to receive, via the communications module and from a client device, a hypertext transfer protocol (HTTP) request; determine that the HTTP request includes a large data request; generate a unique identifier for the large data request and store the unique identifier in a database; route the HTTP request to at least one handler function to perform one or more tasks associated with the large data request; and log updates associated with the large data request based on completion or failure of the one or more tasks in the database in association with the unique identifier.

In one or more embodiments, the instructions, when executed by the at least one processor, further configure the at least one processor to determine the one or more tasks required to complete the large data request.

In one or more embodiments, the instructions, when executed by the at least one processor, further configure the at least one processor to send, via the communications module and to the client device, the unique identifier.

In one or more embodiments, the instructions, when executed by the at least one processor, further configure the at least one processor to receive, via the communications module and from the client device, an update request that includes the unique identifier; perform, using the unique identifier, a lookup in the database to obtain the logged updates associated with the large data request; and send, via the communications module and to the client device, at least one of the logged updates.

In one or more embodiments, the large data request includes a long-running HTTP query.

In one or more embodiments, the HTTP request includes an application programming interface request.

In one or more embodiments, one or more of the logged updates is based on failure of at least one of the tasks and includes data identifying a cause for the failure.

In one or more embodiments, one or more of the logged updates is based on completion of at least one of the tasks and includes data associated with the completed task.

In one or more embodiments, the instructions, when executed by the at least one processor, further configure the at least one processor to provide an application programming interface endpoint for providing updates associated with the large data request; receive, via the communications module and from the client device, a query for the application programming interface endpoint that includes an update request that includes the unique identifier; perform, using the unique identifier, a lookup in the database to obtain the logged updates associated with the large data request; and send, via the communications module and to the client device, a response to the query that includes at least one of the logged updates.

In one or more embodiments, the query is received periodically.

In one or more embodiments, the instructions, when executed by the at least one processor, further configure the at least one processor to determine that all tasks associated with the large data request have completed; generate a response to the HTTP request that includes data generated during the performance of the one or more tasks; and send, via the communications module and to the client device, the response to the HTTP request.

According to another aspect there is provided a computer-implemented method comprising receiving, via a communications module and from a client device, a hypertext transfer protocol (HTTP) request; determining that the HTTP request includes a large data request; generating a unique identifier for the large data request and storing the unique identifier in a database; routing the HTTP request to at least one handler function to perform one or more tasks associated with the large data request; and logging updates associated with the large data request based on completion or failure of the one or more tasks in the database in association with the unique identifier.

In one or more embodiments, the method further comprises determining the one or more tasks required to complete the large data request.

In one or more embodiments, the method further comprises sending, via the communications module and to the client device, the unique identifier.

In one or more embodiments, the method further comprises receiving, via the communications module and from the client device, an update request that includes the unique identifier; performing, using the unique identifier, a lookup in the database to obtain the logged updates associated with the large data request; and sending, via the communications module and to the client device, at least one of the logged updates.

In one or more embodiments, the large data request includes a long-running HTTP query.

In one or more embodiments, one or more of the logged updates is based on failure of at least one of the tasks and includes data identifying a cause for the failure.

In one or more embodiments, one or more of the logged updates is based on completion of at least one of the tasks and includes data associated with the completed task.

In one or more embodiments, the method further comprises providing an application programming interface endpoint for providing updates associated with the large data request; receiving, via the communications module and from the client device, a query for the application programming interface endpoint that includes an update request that includes the unique identifier; performing, using the unique identifier, a lookup in the database to obtain the logged updates associated with the large data request; and sending, via the communications module and to the client device, a response to the query that includes at least one of the logged updates.

According to another aspect there is provided a non-transitory computer readable medium having stored thereon processor-executable instructions which, when executed by at least one processor, configure the at least one processor to receive, via a communications module and from a client device, a hypertext transfer protocol (HTTP) request; determine that the HTTP request includes a large data request; generate a unique identifier for the large data request and store the unique identifier in a database; route the HTTP request to at least one handler function to perform one or more tasks associated with the large data request; and log updates associated with the large data request based on completion or failure of the one or more tasks in the database in association with the unique identifier.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

In the present application, various functionalities discussed herein may be performed by a single processor or by any one of one or more processors, either alone or in combination.

Figure 1:
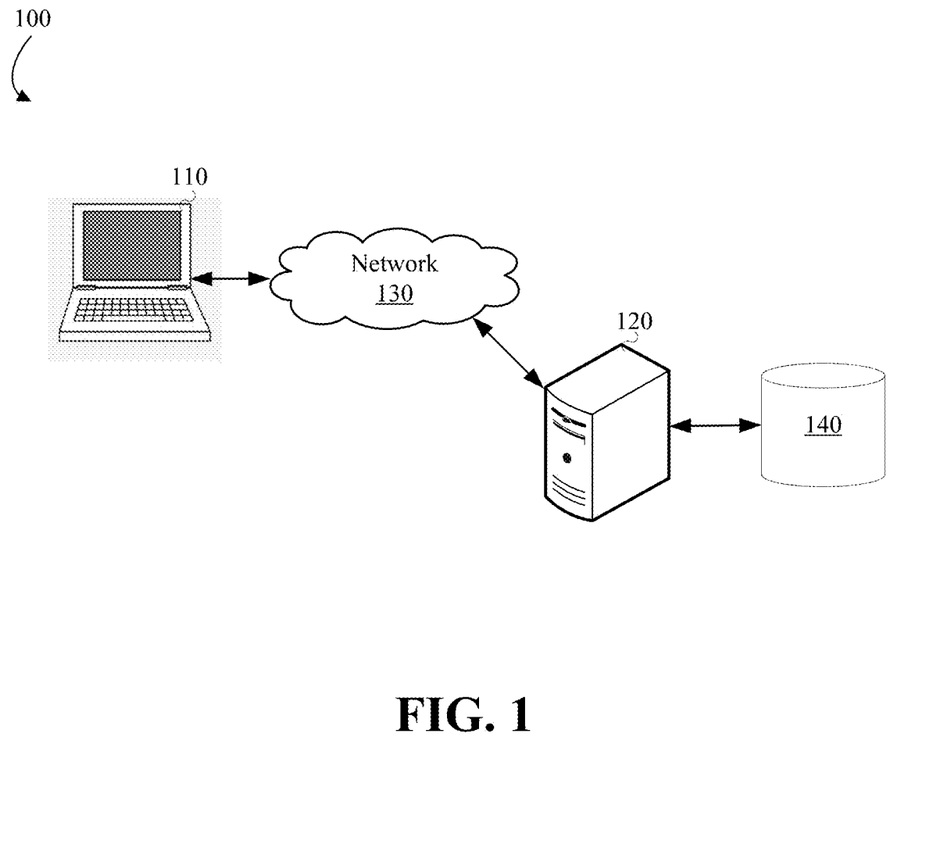
FIG. 1 is a schematic operation diagram illustrating an operating environment of an example embodiment.

FIG. 1 is a schematic operation diagram illustrating an operating environment of an example embodiment. As shown, the system 100 includes a client device 110 and a server computer system 120 coupled to one another through a network 130, which may include a public network such as the Internet and/or a private network. The client device 110 and the server computer system 120 may be in geographically disparate locations. Put differently, the client device 110 and the server computer system 120 may be located remote from one another.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The client device 110 may be a laptop computer as shown in FIG. 1. However, the client device 110 may be a computing device of another type such as for example a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

As will be described in more detail below, the server computer system 120 may be configured to handle hypertext transfer protocol (HTTP) requests such as for example large data requests received from the client device 110.

In one or more embodiments, the server computer system 120 may be associated with or may communicate with a database 140. As will be described in more detail, the database 140 may store one or more unique identifiers associated with one or more large data requests and may log updates associated with the large data request in association with the unique identifier.

Figure 2:
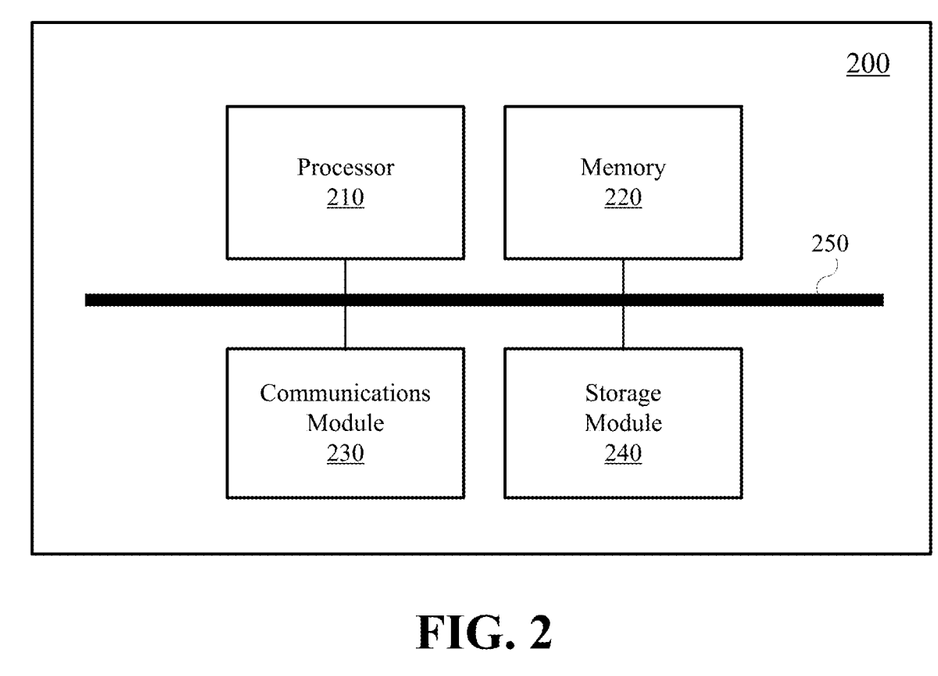
FIG. 2 is a high-level schematic diagram of an example computing device.

FIG. 2 is a high-level schematic diagram of a computer system 200. The computer system 200 may be any one of the client device 110 and/or the server computer system 120.

The computer system 200 includes a variety of modules. For example, as illustrated, the computer system 200 may include a processor 210, a memory 220, a communications module 230, and/or a storage module 240. Further, while not illustrated in FIG. 2, the computer system 200 may include an I/O module. As illustrated, the foregoing example modules of the computer system 200 are in communication over a bus 250. As such, the bus 250 may be considered to couple the various modules of the computer system 200 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the computer system 200.

The communications module 230 allows the computer system 200 to communicate with other computing devices and/or various communications networks such as, for example, the network 130. For example, the communications module 230 may allow the computer system 200 to send or receive communications signals. Communications signals may be sent or received according to one or more protocols or according to one or more standards. The communications module 230 may allow the computer system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the computer system 200 to communicate using near-field communication (NFC), via Wi-Fi™, using Bluetooth™ or via some combination of one or more networks or protocols. In some embodiments, all or a portion of the communications module 230 may be integrated into a component of the computer system 200. For example, the communications module 230 may be integrated into a communications chipset.

The I/O module is an input/output module. The I/O module allows the computer system 200 to receive input from and/or to provide input to components of the computer system 200 such as, for example, various input modules and output modules. For example, the I/O module may, as shown, allow the computer system 200 to receive input from and/or provide output to a display.

The storage module 240 allows data to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in/from a database, such as the database 140 of FIG. 1 when the computer system is operating as the server computer system 120 of FIG. 1. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
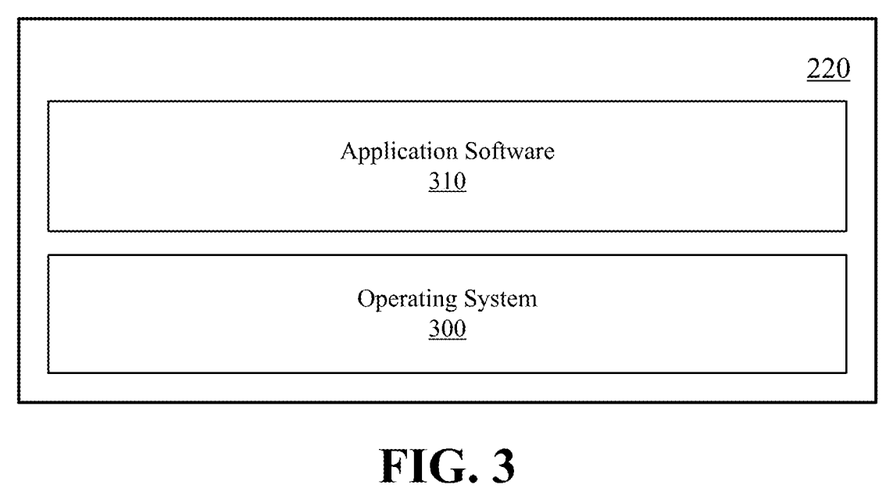
FIG. 3 shows a simplified organization of software components stored in a memory of the example computing device of FIG. 2.

FIG. 3 depicts a simplified organization of software components stored in the memory 220 of the computer system 200. As illustrated, these software components include an operating system 300 and an application software 310.

The operating system 300 is software. The operating system 300 allows the application software 310 to access the processor 210 (FIG. 2), the memory 220, the communications module 230, the I/O module, and the storage module 240 of the computer system 200. The operating system 300 may be, for example, Google™ Android™, Apple™ iOS™, UNIX™, Linux™, Microsoft™ Windows™, Apple OSX™ or the like.

The application software 310 adapts the computer system 200, in combination with the operating system 300, to operate as a device for performing a specific function. For example, the application software 310 may cooperate with the operating system 300 to adapt a suitable embodiment of the example computer system 200 to operate as the client device 110 and/or the server computer system 120.

The server computer system 120 may provide an application programming interface (API) that may be configured to receive API requests from the client device 110.

In one or more embodiments, the server computer system 120 may provide or offer one or more endpoints that represent the features or resources provided by the API. The endpoints may be configured to accept API requests from the client device 110 that include parameters specifying the details of the query. The parameters may include additional information such as for example an indication that the operation should be performed asynchronously. In one or more embodiments, the server computer system 120 may additionally or alternatively utilize routing rules, middleware, or other mechanism to dynamically handle API requests received from the client device 110.

The API requests received by the server computer system 120 may include HTTP requests. The server computer system 120 may determine that an HTTP request includes a large data request and may perform operations for logging updates associated with the large data request.

To enable the operations for logging updates associated with large data requests, one or more decorators may be used. For example, a decorator may be defined such that it is applied to a handler function. As such, every time a request is made to a root uniform resource locator (URL), the decorator will be called to enable or trigger logging updates.

Figure 4:
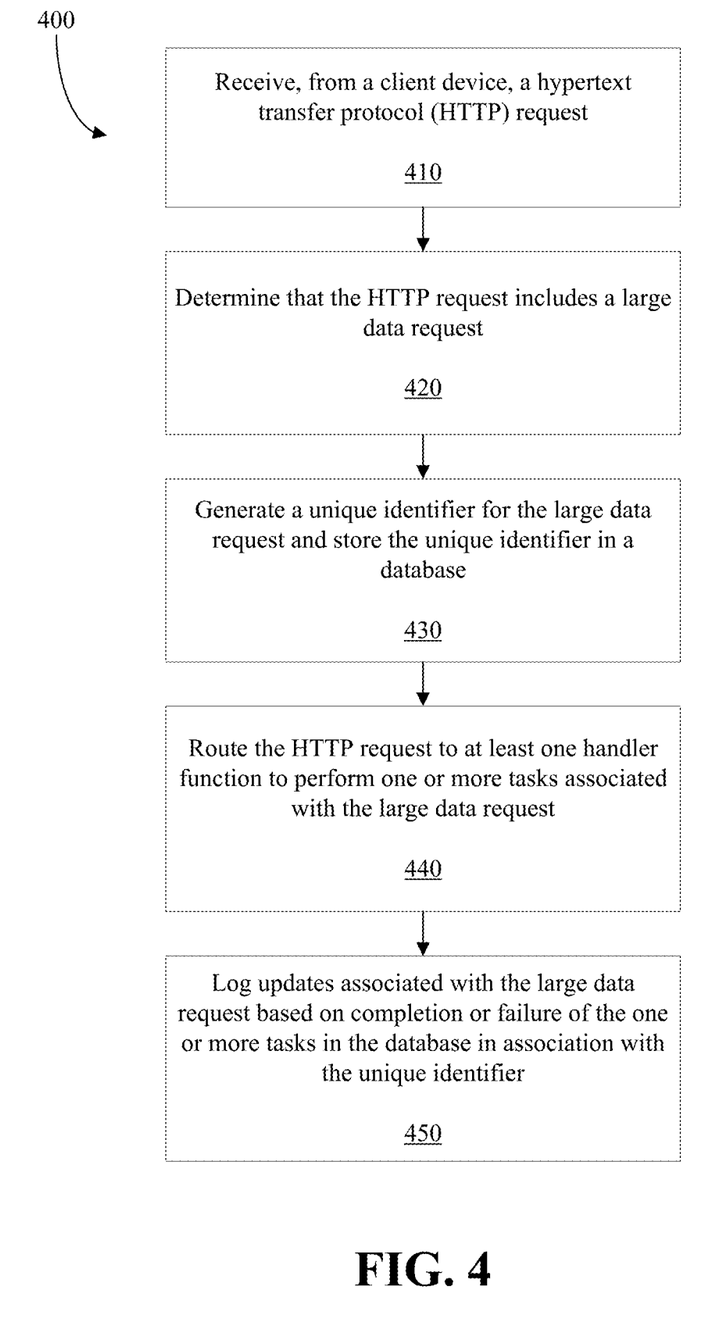
FIG. 4 is a flowchart showing operations performed by a server computer system in logging updates associated with a large data request according to an example embodiment.

Reference is made to FIG. 4, which illustrates, in flowchart form, a method 400 for logging updates associated with a large data request. The method 400 may be implemented by a computing device having suitable processor-executable instructions for causing the computing device to carry out the described operations. The method 400 may be implemented, in whole or in part, by the server computer system 120.

The method 400 includes receiving, from the client device 110, an HTTP request (step 410).

The server computer system 120 may receive an HTTP request from the client device 110. For example, a client application such as for example a web browser or software program executing on the client device 110 may communicate an HTTP request to the server computer system 120. The HTTP request which may include various components such as for example the request method (e.g., GET, POST), headers (e.g., content type). The HTTP request may additionally include a request body with additional data.

The server computer system 120 receives the HTTP request and may parse the request to determine one or more requested actions and any parameters or data included in the request. In one or more embodiments where the server computer system 120 provides an API endpoint, the server computer system 120 may parse the request to determine the endpoint being accessed.

The method 400 includes determining that the HTTP request includes a large data request (step 420).

The server computer system 120 may analyze the HTTP request to determine that the HTTP request includes a large data request.

In one or more embodiments, the server computer system 120 may determine that the HTTP request includes a large data request by parsing the request to determine one or more requested actions. The server computer system 120 may determine that one or more of the requested actions require complex computation, data processing, and/or fetching a large amount of data. As such, the server computer system 120 may determine that the HTTP request includes a large data request.

In one or more embodiments, the server computer system 120 may determine that the HTTP request includes a large data request based on the endpoint that receives the HTTP request. For example, the HTTP request may query a particular endpoint that is dedicated to fielding or receiving large data requests.

In one or more embodiments, the server computer system 120 may determine that the HTTP request includes a large data request by determining or estimating an amount of data required to fulfill the request. The server computer system 120 may compare the amount of data to a threshold. When the amount of data is greater than the threshold it may be determined that the HTTP request includes a large data request.

In one or more embodiments, the server computer system 120 may analyze historical data to determine that the HTTP request includes a large data request. For example, the server computer system 120 may analyze historical data to determine that a similar request was previously made by the client device 110 or by another client device. The server computer system 120 may determine an amount of data obtained when fulfilling the similar request and may compare this amount of data to a threshold. When the amount of data is greater than the threshold it may be determined that the HTTP request includes a large data request.

In one or more embodiments, the server computer system 120 may analyze the HTTP request and may determine that the HTTP request includes a header such as for example a Content-Length header that specifies a size of the request body. The server computer system 120 may inspect the header and may determine that the HTTP request includes a large data request when the size of the request body is greater than a threshold.

In one or more embodiments, the server computer system 120 may analyze the HTTP request and may determine that the HTTP request is a known HTTP request that includes a large data request. For example, the client device 110 may send the same HTTP request every twenty-four (24) hours and as such the server computer system 120 may know that the HTTP request includes a large data request.

In one or more embodiments, the large data request may include a long-running HTTP query and this may be based on a determination that the HTTP request requires a significant amount of time to complete due to complex processing, large data retrieval, and/or asynchronous operations.

In one or more embodiments the server computer system 120 may determine that the large data request includes a long-running HTTP query by determining that complex processing is required to fulfill the request. For example, the server computer system 120 may determine that the HTTP request or large data request requires computationally intensive tasks or operations that require significant processing time before generating a response. It will be appreciated that historical data may be used to determine that the complex processing is required.

In one or more embodiments, the server computer system 120 may determine that the large data request includes a long-running HTTP query by determining that a large amount of data must be fetched to fulfill the request and as a result longer response times may be expected due to the time required to transmit and process the large amount of data. It will be appreciated that historical data may be used to determine that a large amount of data must be fetched.

In one or more embodiments, the server computer system 120 may determine that the large data request includes a long-running HTTP query by determining that asynchronous operations are required to be performed. For example, the server computer system 120 may analyze the HTTP request to identify an indication that one or more operations are to be performed asynchronously. Example operations that may be performed asynchronously may include sending notifications, processing background tasks, etc.

In one or more embodiments, the server computer system 120 may determine one or more tasks required to complete the large data request. For example, the server computer system 120 may analyze the HTTP request and may identify or otherwise determine one or more tasks that must be performed to complete the large data request. In one or more embodiments, determining one or more tasks that must be performed may include identifying one or more handler functions that must be utilized or engaged to perform the one or more tasks. The one or more tasks may be determined based on computer program code included in the request or stored in memory of the server computer system 120. For example, the HTTP request may include the request method and this may be used by the server computer system 120 to determine one or more tasks required.

In determining the one or more tasks required to complete the data request, the server computer system 120 may generate a list of tasks that may be completed to complete the data request. The list may identify one or more tasks that may be performed in parallel and/or one or more tasks that must be performed in series. Tasks in series may require data or input from previous tasks to be completed. Tasks performed in parallel may be performed by the server computer system 120 at the same time and this may be done by way of multiprocessing.

The method 400 includes generating a unique identifier for the large data request and stores the unique identifier in a database (step 430).

In response to determining that the HTTP request includes a large data request, the server computer system 120 generates a unique identifier for the large data request.

The unique identifier may be a unique number or a unique string of characters assigned to the large data request. The unique identifier may include a predefined amount of numbers or characters. For example, the unique identifier may include sixteen (16) numbers and/or letters.

In one or more embodiments, to generate the unique identifier, the server computer system 120 may engage or utilize a random number generator and/or a random string of characters generator to generate the unique identifier.

The unique identifier may additionally or alternatively include, for example, a time and/or date indicating when the large data request was received. For example, the server computer system 120 may record or store a time and/or date based on when the request was received.

The unique identifier may additionally or alternatively include an identifier associated with the client device 110. For example, an address such as for example an internet protocol (IP) address of the client device 110 may be determined or obtained by the server computer system 120 and may be included with the unique identifier. As another example, an identifier of an entity known to be associated with the client device 110 may additionally or alternatively be determined or obtained and may be included with the unique identifier.

Figure 5:
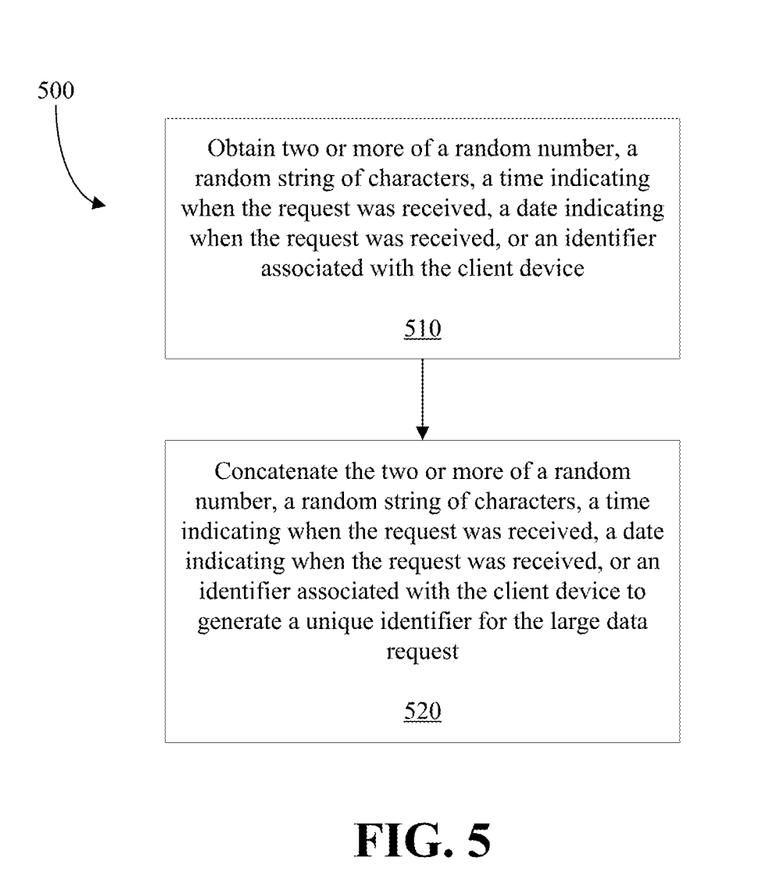
FIG. 5 is a flowchart showing operations performed by a server computer system in generating a unique identifier according to an example embodiment.

In one or more embodiments, the server computer system 120 may obtain two or more types of data and may utilize this data to generate the unique identifier. Reference is made to FIG. 5, which illustrates, in flowchart form, a method 500 for generating a unique identifier. The method 500 may be implemented by a computing device having suitable processor-executable instructions for causing the computing device to carry out the described operations. The method 500 may be implemented, in whole or in part, by the server computer system 120.

The method 500 includes obtaining two or more of a random number, a random string of characters, a time indicating when the request was received, a date indicating when the request was received, or an identifier associated with the client device (step 510).

The random number, random string of characters, time indicating when the request was received, date indicating when the request was received, and/or the identifier associated with the client device may be obtained or determined in manners similar to that described above.

The method 500 includes concatenating the two or more of a random number, a random string of characters, a time indicating when the request was received, a date indicating when the request was received, or an identifier associated with the client device to generate a unique identifier for the large data request (step 520).

The server computer system 120 may engage a software module to generate the unique identifier. For example, the server computer system 120 may utilize Python and/or JavaScript to call one or more functions for concatenating the two or more of a random number, a random string of characters, a time indicating when the request was received, a date indicating when the request was received, or an identifier associated with the client device. The one or more functions for concatenating may join multiple strings together end-to-end to generate the unique identifier. The response to the call may include the unique identifier for the large data request.

Once the unique identifier for the large data request has been obtained or generated, the server computer system 120 may store the unique identifier in a database which may include the database 140 described herein.

In addition to storing the unique identifier in the database, the server computer system 120 may communicate the unique identifier to the client device 110. For example, the client device 110 may send the HTTP request and in response the server computer system 120 may automatically generate and send the unique identifier to the client device 110. As such, the unique identifier may be obtained by the client device 110 in real-time or instantly. In one or more embodiments, the unique identifier may serve as an indication of confirmation that the server computer system 120 has received the HTTP request and is performing operations to fulfill the request.

The method 400 includes routing the HTTP request to at least one handler function to perform one or more tasks associated with the large data request (step 440).

The server computer system 120 may engage or utilize an API framework and/or routing mechanism to route the HTTP request to the appropriate handler function or controller. For example, the server computer system 120 may route the HTTP request based on the endpoint and/or HTTP method defined in the API request. The handler function may be responsible for processing the request and generating a response.

As mentioned, the server computer system 120 may determine one or more tasks associated with the large data request. As such, the server computer system 120 may route the HTTP request to at least one handler function and this may be based on the determined one or more tasks. For example, a first handler function may be utilized to perform a first one of the tasks and a second handler function may be utilized to perform a second one of the tasks.

As mentioned, to enable the operations for logging updates associated with large data requests, one or more decorators may be used. For example, a decorator may be defined such that it is applied to the handler function and enables or triggers logging updates.

The method 400 includes logging updates associated with the large data request based on completion or failure of the one or more tasks in the database in association with the unique identifier (step 450).

The server computer system 120 may monitor progress of the performance of the one or more tasks and may log updates accordingly. For example, the server computer system 120 may receive an indication of completion of a first task from the handler function responsible for performing the first task. In response, the server computer system 120 may log an update indicating completion of the first task in the database. The log indicating completion of the first task in the database may include data associated with the completed task. For example, the first task may include calculating a particular value and as such the log indicating completion of the first task may include the calculated particular value. The log may be stored in association with the unique identifier for the large data request.

As another example, the server computer system 120 may receive an indication of failure of a second task from the handler function responsible for performing the second task. The indication may include an error code and/or a reason for the failure. In response, the server computer system 120 may log an update indicating failure of the second task in the database. The log indicating failure of the second task in the database may include data identifying a cause for failure of the second task. For example, the log indicating failure of the second task may include the error code and/or the reason for the failure.

It will be appreciated that failure of a particular task does not cancel or otherwise halt the fulfilling of the large data request. For example, failure of the second task does not stop or prevent performance of subsequent or parallel tasks.

The server computer system 120 and/or the at least one handler function may continue to perform the one or more tasks and log updates based on completion or failure of the one or more tasks. The updates are logged in the database in association with the unique identifier.

Figure 6:
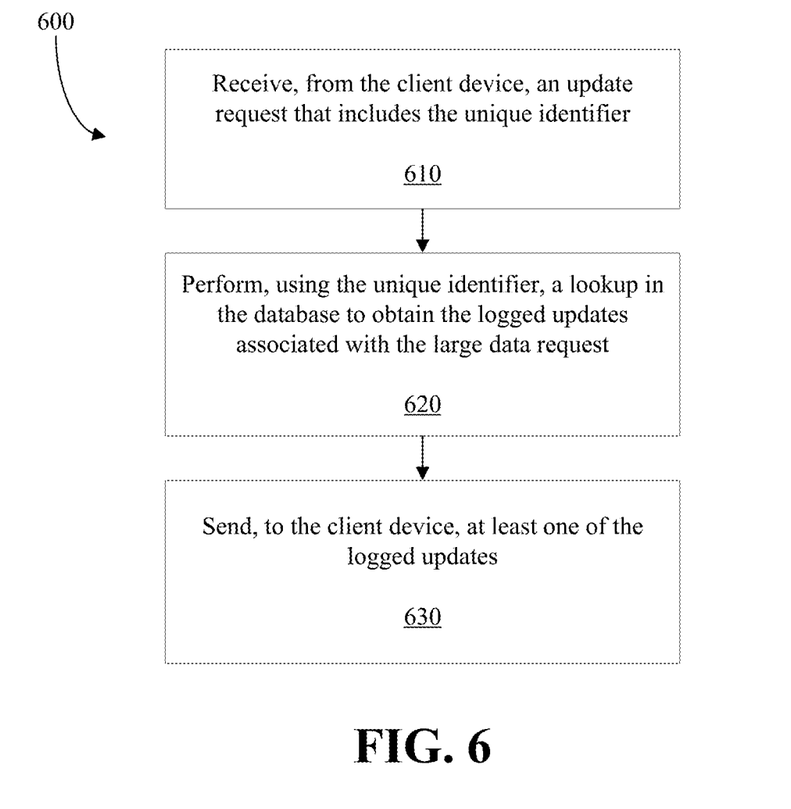
FIG. 6 is a flowchart showing operations performed by a server computer system in sending logged updates according to an example embodiment.

While the client device 110 is waiting for the server computer system 120 to complete the large data request, the client device 110 may request updates from the server computer system 120 and in response, the server computer system 120 may communicate one or more of the logged updates to the client device 110. Reference is made to FIG. 6, which illustrates, in flowchart form, a method 600 for sending logged updates. The method 600 may be implemented by a computing device having suitable processor-executable instructions for causing the computing device to carry out the described operations. The method 600 may be implemented, in whole or in part, by the server computer system 120.

The method 600 includes receiving, from the client device 110, an update request that includes the unique identifier (step 610).

While the client device 110 is waiting for the server computer system 120 to complete the large data request, the client device 110 may send an update request to the server computer system 120. The update request includes the unique identifier for the large data request.

As mentioned, the unique identifier may include an identifier associated with the client device 110 such as for example an IP address of the client device 110 and/or an identifier of an entity associated with the client device 110. In one or more embodiments, the identifier associated with the client device 110 may be used to authenticate the client device 110. For example, the IP address of the client device 110 may be obtained from the update request and this may be compared to a portion of the unique identifier to ensure the IP address is the same IP address of the client device 110 that was obtained when receiving the HTTP request.

The update request may specify what updates the client device 110 would like to receive. For example, the update request may include at least one of a request for all logged updates, a request for confirmation that all completes tasks were successful, a request for all failed tasks, a request for a count of all completed tasks and a count of all uncompleted tasks, or a request for data associated with one or more of the completed tasks. As another example, the update request may include a response for a detailed progress report.

The method 600 includes performing, using the unique identifier, a lookup in the database to obtain the logged updates associated with the large data request (step 620).

The server computer system 120 performs a lookup in the database to obtain the logged updates associated with the large data request. The database may include the database 140 described herein.

As mentioned, the logged updates are based on completion or failure of the one or more tasks. One or more of the logged updates may be based on failure of at least one of the tasks and as such may include data identifying a cause for the failure. One or more of the updates may be based on completion of at least one of the tasks and includes data associated with the completed task. The server computer system 120 may obtain all logged updates for all completed tasks for the large data request. Of course, uncompleted tasks will not have any updates stored in the database.

The method 600 includes sending, to the client device, at least one of the logged updates (step 630).

As mentioned, the update request may include at least one of a request for all logged updates, a request for confirmation that all completes tasks were successful, a request for all failed tasks, a request for a count of all completed tasks and a count of all uncompleted tasks, a request for a count of all failed tasks, or a request for data associated with one or more of the completed tasks.

In embodiments where the update request includes a request for all logged updates, the server computer system 120 may send all of the logged updates to the client device 110. The logged updates may include data identifying a cause for the failure for any failed tasks and may include data associated with each completed task.

In embodiments where the update request includes a request for confirmation that all completed tasks were successful, the server computer system 120 may send an indication such as a binary flag that indicates whether or not all completed tasks were successful.

In embodiments where the update request includes a request for all failed tasks, the server computer system 120 may send a list of all failed tasks. The list may include data identifying a cause for the failure for each failed task.

In embodiments where the update request includes a request for a count of all completed tasks and a count of all uncompleted tasks, the server computer system 120 may determine the count of all completed tasks and the count of all uncompleted tasks and may send these counts to the client device 110.

In embodiments where the update request includes a request for a count of all failed tasks, the server computer system 120 may determine the count of all failed tasks and may send this count to the client device 110.

In embodiments where the update request includes a request for data associated with one or more of the completed tasks, the server computer system 120 may send the data associated with the one or more of the completed tasks. For example, the request may only request data from a particular completed task and as such the server computer system 120 may obtain the data for the particular completed task and may send the data to the client device 110.

It will be appreciated that the client device 110 may request other updates from the server computer system 120 using the unique identifier.

In embodiments where the client device 110 is authenticated using the unique identifier, it will be appreciated that the server computer system 120 may only send the at least one of the logged updates when authentication of the client device 110 is successful.

In manners described herein, the unique identifier may be used by the client device 110 to ping the server computer system 120 to obtain updates therefrom while the server computer system 120 is performing tasks to complete the large data request. As such, the client device 110 is able to track progress of the large data request.

Figure 7:
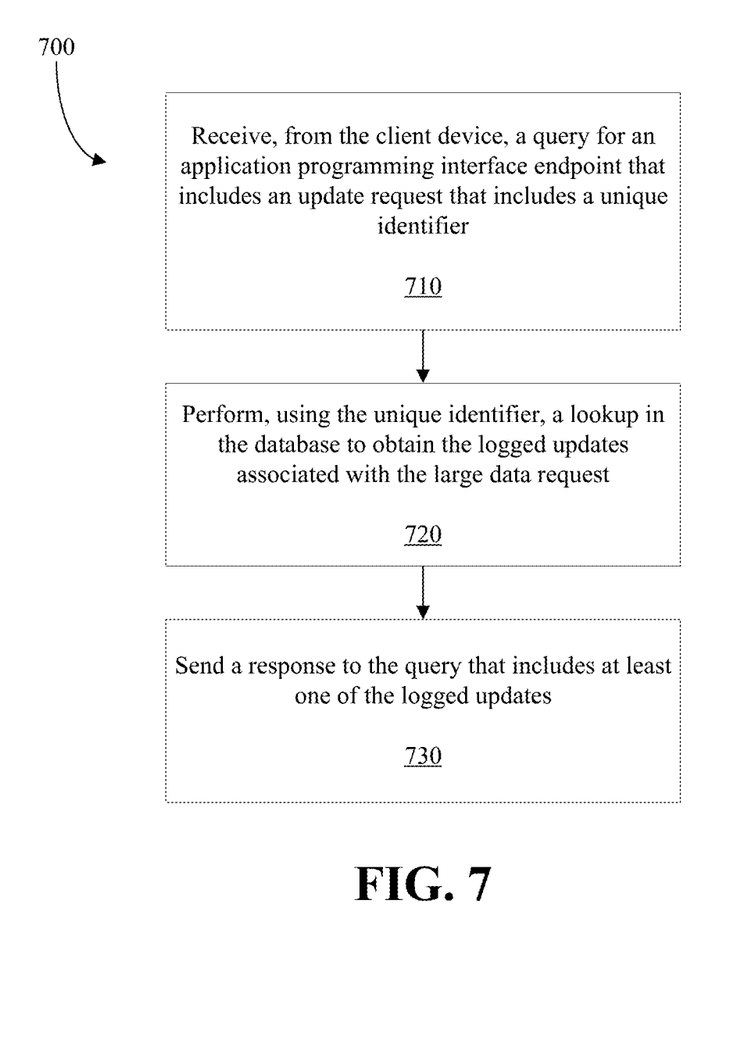
FIG. 7 is a flowchart showing operations performed by a server computer system in handling update requests according to an example embodiment.

In one or more embodiments, the server computer system 120 may provide an application programming interface (API) endpoint that may receive or otherwise handle queries for updates associated with the large data request. For example, the API endpoint may receive an update request that includes the unique identifier in the form of an HTTP request or query. In this example, the client device 110 may communicate update requests to the dedicated endpoint for handling the update requests.

Reference is made to FIG. 7, which illustrates, in flowchart form, a method 700 for handling update requests. The method 700 may be implemented by a computing device having suitable processor-executable instructions for causing the computing device to carry out the described operations. The method 700 may be implemented, in whole or in part, by the server computer system 120.

The method 700 includes receiving, from the client device 110, a query for the application programming interface endpoint that includes an update request that includes the unique identifier (step 710).

The query may include an HTTP request or query. In one or more embodiments, the query may be received periodically such as for example every minute, every hour, etc. This may be similar to step 610 of the method 600 described herein.

The method 700 includes performing, using the unique identifier, a lookup in the database to obtain the logged updates associated with the large data request (step 720) and this may be done similar to step 620 of the method 600 described herein.

The method 700 includes sending a response to the query that includes at least one of the logged updates (step 730) and this may be done similar to step 630 of the method 600 described herein.

In this manner, the dedicated endpoint may be polled periodically by the client device 110 to provide continuous updates associated with the large data request.

In one or more embodiments, the client device 110 may receive the continuous updates and may perform one or more operations. For example, each time an update is received the client device 110 may be configured to send the updates to one or more recipients via electronic mail. As another example, the client device 110 may be connected to a display screen and may display a graphical user interface configured to display the updates.

Figure 8:
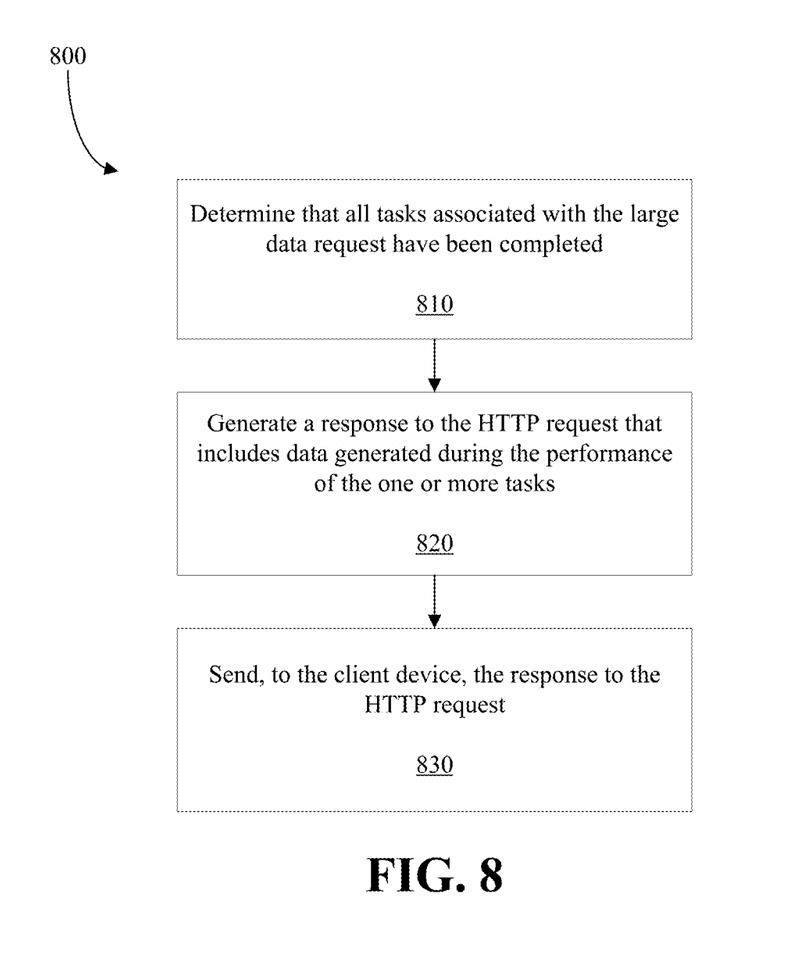
FIG. 8 is a flowchart showing operations performed by a server computer system in sending a response to an HTTP request according to an example embodiment.

The server computer system 120 may continue to perform the tasks required to complete the large data request (or HTTP request) and may send a response to the client device 110. Reference is made to FIG. 8, which illustrates, in flowchart form, a method 800 for sending a response to an HTTP request. The method 800 may be implemented by a computing device having suitable processor-executable instructions for causing the computing device to carry out the described operations. The method 800 may be implemented, in whole or in part, by the server computer system 120.

The method 800 includes determining that all tasks associated with the large data request have been completed (step 810).

In one or more embodiments, the server computer system 120 may determine that all tasks have been completed based on communications with one or more handler functions. For example, as mentioned, for example during the method 400 described herein, the server computer system 120 routes the HTTP request to at least one handler function to perform one or more tasks associated with the large data request. The server computer system 120 may determine that all tasks associated with the large data requests have been completed when the at least one handler function has sent an indication that the tasks have been completed. In embodiments where more than one handler function is utilized, the server computer system 120 may wait until indications of completion from all handler functions are received.

As another example, the server computer system 120 may monitor the logged updates stored in the database in association with the unique identifier. The server computer system 120 may determine that all tasks have been completed when it is determined that all tasks have a logged update stored in the database 140. It will be appreciated that the logged updates may indicate that one or more tasks have failed and the server computer system 120 may determine that all tasks have been completed even when one or more of the tasks has failed. Put another way, the requirement in this example is that each task has a logged update and not a requirement that all tasks have completed successfully.

The method 800 includes generating a response to the HTTP request that includes data generated during the performance of the one or more tasks (step 820).

Responsive to determining that all tasks associated with the HTTP request (or large data request) have been completed, the server computer system 120 generates a response to the HTTP request.

In one or more embodiments, the response to the HTTP request may include a data file that includes data for all completed tasks. For example, as mentioned, data associated with a complete task is stored in the database in response to successful completion of the task. As such, the server computer system 120 may obtain data for all successfully completed tasks from the database 140 and may generate a date file that includes the obtained data. The data file may include, for example, a Microsoft™ Excel™ or portable document format (PDF) document that includes the obtained data. The data file may include additional data such as for example headers and/or identifiers that provide context for the obtained data. For example, one cell in the Microsoft Excel document may include data associated with a mutual fund and as such an adjacent cell may include an identifier or name of the mutual fund.

As mentioned, any tasks that failed may have data stored in the database 140 that identifies a cause of failure. As such, the server computer system 120 may determine that data is not available for that task and as such may indicate that a failure occurred in the data file. For example, rather than providing a value, the server computer system 120 may indicate that a failure occurred and this may be done in the datafile for that particular task. The indication may include, for example, an error code for the failure.

In one or more embodiments, the server computer system 120 may generate the file using computer program code that may include instructions, for example, to populate one or data fields using data obtained from the logged updates.

In one or more embodiments, the server computer system 120 may generate a separate data file for all successfully completed tasks and a separate data file for all tasks that failed. For example, prior to generating the response to the HTTP request, the server computer system 120 may analyze the data stored in the database 140 to determine whether or not one or more talks failed. When it is determined that none of the tasks have failed, the server computer system 120 may generate a single data file that includes data for all completed tasks. When it is determined that at least one of the tasks has failed, the server computer system 120 may generate a first data file for all successfully completed tasks and may generate a second data file for all tasks that failed. The first data file may include data for all successfully completed tasks. The second data file may include data identifying a cause for the failure of each task that failed.

The method 800 includes sending, to the client device, the response to the HTTP request (step 830).

The server computer system 120 sends a response to the HTTP request. In embodiments where the server computer system 120 generates one or more data files that includes data for all completed tasks (and/or data for all tasks that failed), the response may include the one or more data files.

The systems and methods described herein may be utilized to provide updates during processing of large data requests. For example, the large data request may include a request to generate a worldwide report that obtains data from a large number of remote computer server systems. The large data request may take hours or even days to complete and as such the unique identifier described herein may be used to obtain updates during processing of the large data request.

The systems and methods described here may be utilized to generate or provide progress updates to one or more client devices. For example, the large data request may include a request to process shipping manifests for previous days data. The endpoint provided by the server computer system may be engaged and may be pinged or otherwise prompted to generate progress updates every time ten thousand (10,000) shipping manifests have been processed.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A computer server system comprising:
   at least one processor;
   a communications module coupled to the at least one processor; and
   a memory coupled to the at least one processor and storing processor-executable instructions which, when executed by the at least one processor, configure the at least one processor to:
   receive, via the communications module and from a client device, a hypertext transfer protocol (HTTP) request directed to an application programming interface (API) endpoint;
   determine that the HTTP request includes a large data request;
   generate a unique identifier for the large data request and store the unique identifier in a database in association with the large data request;
   route the HTTP request to at least one handler function to perform one or more tasks required to fulfill the large data request;
   apply a decorator to the at least one handler function to enable automatic logging of progress updates during task execution; and
   log updates associated with the large data request in the database, in association with the unique identifier, the updates indicating completion or failure of the one or more tasks.

2. The computer server system of claim 1, wherein the instructions, when executed by the at least one processor, further configure the at least one processor to:
   determine the one or more tasks required to fulfill the large data request.

3. The computer server system of claim 1, wherein the instructions, when executed by the at least one processor, further configure the at least one processor to:
   send, via the communications module and to the client device, the unique identifier.

4. The computer server system of claim 3, wherein the instructions, when executed by the at least one processor, further configure the at least one processor to:
   receive, via the communications module and from the client device, an update request that includes the unique identifier;
   perform, using the unique identifier, a lookup in the database to obtain the logged updates associated with the large data request; and
   send, via the communications module and to the client device, at least one of the logged updates.

5. The computer server system of claim 1, wherein the large data request includes a long-running HTTP query.

6. The computer server system of claim 1, wherein one or more of the logged updates is based on failure of at least one of the tasks and includes data identifying a cause for the failure.

7. The computer server system of claim 1, wherein one or more of the logged updates is based on completion of at least one of the tasks and includes data associated with the completed task.

8. The computer server system of claim 1, wherein the instructions, when executed by the at least one processor, further configure the at least one processor to:
   provide the application programming interface endpoint for providing updates associated with the large data request;
   receive, via the communications module and from the client device, a query for the application programming interface endpoint that includes an update request that includes the unique identifier;
   perform, using the unique identifier, a lookup in the database to obtain the logged updates associated with the large data request; and
   send, via the communications module and to the client device, a response to the query that includes at least one of the logged updates.

9. The computer server system of claim 8, wherein the query is received periodically.

10. The computer server system of claim 1, wherein the instructions, when executed by the at least one processor, further configure the at least one processor to:

determine that all tasks associated with the large data request have completed; and generate a response to the HTTP request that includes data generated during the performance of the one or more tasks; and send, via the communications module and to the client device, the response to the HTTP request.

11. A computer-implemented method comprising:

receiving, via a communications module and from a client device, a hypertext transfer protocol (HTTP) request directed to an application programming interface (API) endpoint;

determining that the HTTP request includes a large data request;

generating a unique identifier for the large data request and storing the unique identifier in a database in association with the large data request;

routing the HTTP request to at least one handler function to perform one or more tasks required to fulfill the large data request;

applying a decorator to the at least one handler function to enable automatic logging of progress updates during task execution; and logging updates associated with the large data request in the database, in association with the unique identifier, the updates indicating completion or failure of the one or more tasks.

12. The computer-implemented method of claim 11, further comprising:

determining the one or more tasks required to fulfill the large data request.

13. The computer-implemented method of claim 11, further comprising:

sending, via the communications module and to the client device, the unique identifier.

14. The computer-implemented method of claim 13, further comprising:

receiving, via the communications module and from the client device, an update request that includes the unique identifier;

performing, using the unique identifier, a lookup in the database to obtain the logged updates associated with the large data request; and sending, via the communications module and to the client device, at least one of the logged updates.

15. The computer-implemented method of claim 11, wherein the large data request includes a long-running HTTP query.

16. The computer-implemented method of claim 11, wherein one or more of the logged updates is based on failure of at least one of the tasks and includes data identifying a cause for the failure.

17. The computer-implemented method of claim 11, wherein one or more of the logged updates is based on completion of at least one of the tasks and includes data associated with the completed task.

18. The computer-implemented method of claim 11, further comprising:

providing the application programming interface endpoint for providing updates associated with the large data request;

receiving, via the communications module and from the client device, a query for the application programming interface endpoint that includes an update request that includes the unique identifier;

performing, using the unique identifier, a lookup in the database to obtain the logged updates associated with the large data request; and sending, via the communications module and to the client device, a response to the query that includes at least one of the logged updates.

19. A non-transitory computer readable medium having stored thereon processor-executable instructions which, when executed by at least one processor, configure the at least one processor to:

receive, via a communications module and from a client device, a hypertext transfer protocol (HTTP) request directed to an application programming interface (API) endpoint;

determine that the HTTP request includes a large data request;

generate a unique identifier for the large data request and store the unique identifier in a database in association with the large data request;

route the HTTP request to at least one handler function to perform one or more tasks required to fulfill the large data request;

apply a decorator to the at least one handler function to enable automatic logging of progress updates during task execution; and log updates associated with the large data request in the database, in association with the unique identifier, the updates indicating completion or failure of the one or more tasks.

* * * * *